US012566447B2

(12) United States Patent
Rekdal et al.

(10) Patent No.: US 12,566,447 B2
(45) Date of Patent: Mar. 3, 2026

(54) METHOD FOR STEERING AN AUTONOMOUS UNDERWATER VEHICLE ALONG A BURIED OBJECT IN THE SEABED

(71) Applicant: Kongsberg Discovery AS, Horten (NO)

(72) Inventors: Thorbjørn Rekdal, Høvik (NO); Trond E. Figenschou Crantz, Hvalstad (NO)

(73) Assignee: Kongsberg Discovery AS, Horten (NO)

( * ) Notice: Subject to any disclaimer, the term of this patent is extended or adjusted under 35 U.S.C. 154(b) by 183 days.

(21) Appl. No.: 18/562,781

(22) PCT Filed: Apr. 29, 2022

(86) PCT No.: PCT/NO2022/050097
§ 371 (c)(1),
(2) Date: Nov. 20, 2023

(87) PCT Pub. No.: WO2022/245219
PCT Pub. Date: Nov. 24, 2022

(65) Prior Publication Data
US 2024/0248482 A1 Jul. 25, 2024

(30) Foreign Application Priority Data
May 20, 2021 (NO) .................................. 20210626

(51) Int. Cl.
*G05D 1/242* (2024.01)
*B63G 8/00* (2006.01)
(Continued)

(52) U.S. Cl.
CPC ............. *G05D 1/242* (2024.01); *B63G 8/001* (2013.01); *G01S 15/003* (2013.01);
(Continued)

(58) Field of Classification Search
None
See application file for complete search history.

(56) References Cited

U.S. PATENT DOCUMENTS

| 8,949,042 | B1 | 2/2015 | Goroshevskiy et al. |
| 9,285,222 | B2 | 3/2016 | Waite et al. |
| | | (Continued) | |

FOREIGN PATENT DOCUMENTS

| CN | 106324687 A | 9/2016 |
| EP | 0 010 331 A1 | 4/1980 |
| | (Continued) | |

OTHER PUBLICATIONS

Ainslie, A., "Principles of Sonar Performance Modelling", Springer praxis, chapter 2, ISBN 783540 876618, retrieved from: https://beckassets.blob.core.windows.net/product/readingsample/712392/9783540876618_excerpt_001.pdf; publication date 2010; p. 47, line 20-26; pp. 28-30; section 2.4.1 "Gaussian Noise" section 2.1.1.3 "Attenuation of sound."

(Continued)

*Primary Examiner* — Jelani A Smith
*Assistant Examiner* — Davin Seol
(74) *Attorney, Agent, or Firm* — Knobbe, Martens, Olson & Bear, LLP

(57) ABSTRACT

A method for steering an Autonomous Underwater Vehicle along an object buried below a seabed: the AUV being equipped with at least one acoustic transmitter for generating acoustic signal towards the buried object and the seabed; arranging a first sensor assembly flush with the AUV hull of the starboard side of the AUV for recording reflected acoustic signal from the buried object and the seabed, arranging a second sensor assembly flush with the AUV hull of the port side of the AUV for recording reflected acoustic signal from the buried object and the seabed.

13 Claims, 3 Drawing Sheets

(51) Int. Cl.

| | | |
|---|---|---|
| *G01S 15/00* | (2020.01) | |
| *G01S 15/89* | (2006.01) | |
| *G05D 107/00* | (2024.01) | |
| *G05D 109/30* | (2024.01) | |
| *G05D 111/20* | (2024.01) | |

(52) U.S. Cl.
CPC .... *G01S 15/8902* (2013.01); *B63G 2008/004* (2013.01); *G05D 2107/25* (2024.01); *G05D 2109/38* (2024.01); *G05D 2111/20* (2024.01)

(56) References Cited

U.S. PATENT DOCUMENTS

| | | | |
|---|---|---|---|
| 2014/0165898 A1 | 6/2014 | Cierpka et al. | |
| 2016/0223659 A1* | 8/2016 | Mandelert | G01S 15/42 |
| 2018/0106614 A1* | 4/2018 | Visentin | G01S 15/876 |

FOREIGN PATENT DOCUMENTS

| | | | |
|---|---|---|---|
| EP | 0772787 A2 | 5/1997 | |
| JP | 2016-159662 A | 9/2016 | |
| WO | WO 2000-000848 A | 1/2000 | |
| WO | WO 2014-025464 A1 | 2/2014 | |
| WO | WO 2019-169173 A1 | 9/2019 | |
| WO | WO 2019-208757 A1 | 10/2019 | |

OTHER PUBLICATIONS

Dubrovinskaya, E., & Casari, P. (Jun. 2019). Underwater direction of arrival estimation using wideband arrays of opportunity. In *OCEANS 2019*—Marseille (pp. 1-7). IEEE.

Evans J. et al. Autotracker: Autonomous inspection—capabilities and lessons learned in offshore operations, Oceans 2009, MTS/IEEE Biloxi—Marine Technology for Our Future: Global and Local Challenges. Oct. 26, 2009. IEEE, Piscataway, NJ, USA, pp. 1-7.

Inzartsev, A. and Pavin, A. (2009). AUV Application for Inspection of Underwater Communications, Underwater Vehicles, Alexander V. Inzartsev (Ed.), ISBN: 978-953-7619-49-7, InTech.

Knapp, C., and Carter. G., "The generalized correlation method for estimation of time delay," in *IEEE Transactions on Acoustics, Speech, and Signal Processing*, vol. 24, No. 4, pp. 320-327. Aug. 1976, doi: 10.1109/TASSP.1976.1162830.

Schock, S.G. et al. Buried Object scanning sonar, IEEE Journal of Oceanic Engineering, Oct. 2001, vol. 26, No. 4, pp. 677-689, ISSN 1558-1692.

International Search Report for Application No. PCT/NO2022/050097, dated Jul. 1, 2022.

Norwegian Search Report for Application No. 20210626, dated Mar. 24, 2023.

Extended European Search Report dated Feb. 20, 2025 in Application No. 22805052.2, 10 pages.

* cited by examiner

METHOD FOR STEERING AN AUTONOMOUS UNDERWATER VEHICLE ALONG A BURIED OBJECT IN THE SEABED

TECHNICAL FIELD

The present disclosure relates to a method for steering an autonomous underwater vehicle along an object that is at least partly buried in seabed: the AUV being equipped with at least one acoustic transmitter for generating acoustic signal towards the buried object and the seabed; a first sensor assembly, a computer program product and a computer readable storage medium. More specifically, the disclosure relates to a method for steering an autonomous underwater vehicle along an object that is at least partly buried in seabed: the AUV being equipped with at least one acoustic transmitter for generating acoustic signal towards the buried object and the seabed; a first sensor assembly, a computer program product and a computer readable storage medium as defined in the introductory parts of claim 1, claim 12 and claim 13.

BACKGROUND ART

Pipeline, cable or object inspections are usually performed by an ROV following the object with a camera or video. Such an object can be all sorts of cables, pipelines, installations or minerals that will reflect a seismic signal. ROVs must be operated from a surface vessel through a tether/umbilical. Due to the nature of this operation, the ROV's speed is limited by the tether and its operational performance. Autonomous Underwater Vehicles (AUV) have been introduced as an efficient vehicle for subsea object inspections, since an AUV can track a pipeline, cable or other object over long distances independent of a surface vessel and operate at a significantly higher speed. The AUV is capable of performing adaptive steering utilizing acoustic signals from a multibeam or a side scan sonar sensor system as long as the object is above the seafloor. As soon as the object is buried, the sensors the AUV utilised for adaptive steering can no longer track the object. If the object is buried, the seafloor above the object is detected, but not the object itself. The AUV may have a source and sensor system that can acquire reflected signals from rapid changes in geology or object. An example of such a system is a Sub Bottom Profiler (SBP). However, a SBP system is utilized as a measurement without directional information. The data recorded by the SBP sensors are summed and utilized in the same way as a single sensor without the ability to determine the direction to a reflection point. E.g., if the sensor records a signal from an object, it is not able to determine whether the signal comes from either side or from directly below the AUV.

US 2014/0165898 A1 discloses an unmanned underwater vehicle for localizing and examining an object, for example a pipeline, arranged at the bottom of a body of water. The vehicle comprises a multi-sensor system including a 3D underground sonar and at least one further sensor. The at least one further sensor may comprise at least one camera, a side scan sonar device, a multi-beam sonar device, a front scan sonar device and/or at least one magnetic sensor and/or gradiometer probes and/or a magnetometer, in particular a vector magnetometer, of a magnetic field detection device.

U.S. Pat. No. 9,285,222 B2 discloses a system and method for providing autonomous navigation for an Autonomous Vehicle such as an Unmanned Air Vehicle (UAV) or an Autonomous Underwater Vehicle (AUV) in the vicinity of power lines or other signal carrying lines or underwater cable is presented. Autonomous navigation is achieved by measuring the magnitude and phase of the electromagnetic field at an unknown location within a space under excitation by a set of power cables of the power line with one or more orthogonal electromagnetic sensors formed on the AV; and estimating parameters related to a position and orientation of the AV, and load parameters of each cable based on the residual error between the measured set of complex electromagnetic field values corresponding to a combined model of the set of power cables.

WO2000000848A discloses an apparatus for detecting a metal object comprising transmitter means for generating a pulsed or an alternating magnetic field in the vicinity of the metal object to be detected and detection means for detecting the secondary magnetic field induced in the metal object by the transmitted magnetic field. The detection means comprise means for measuring at least three magnetic field gradient components of at least first order of the secondary magnetic field. The apparatus also comprises processing means for determining at least one of the positions or the electro-magnetic cross section or an estimate of the shape of the metal object from the measured magnetic field spatial gradient components. The processing means comprises of fitting the measured components to dipole, multiple dipole, multipole, or extended source models.

U.S. Pat. No. 8,949,042 B1 discloses an autonomous magnetic tomography method (MTM) and device for magnetographic identification and magnetographic analysis of mechanical flaws and defects along structures located deep in the sea or otherwise located underwater and further underground. The invention optimizes the inspection and maintenance processes of extended metallic constructions, e.g., pipelines. The device is based on the inverse magnetostrictive effect (i.e., the Villari effect)—the variation of a material's magnetic susceptibility under applied mechanical stress. The changes in magnetic susceptibility result in distribution of a magnetic field gradient along a structure's surface area, thus providing information about the presence and the value of the magnetic field anomaly at a given and precise location on the structure. The device and method is capable of autonomous and offline operation underwater at depths up to 1,500 meters below sea level.

WO 2016/142885 A1 discloses a detection system and method to check the position of a pipeline in a bed of a body of water. The system comprises a support connected to a vessel by a connection system. The connection system comprises actuators that enable adjusting an immersion depth of the support in the body of water. A plurality of acoustic wave sources and a number of acoustic wave receivers are distributed along the support. In an alternative embodiments, the sources comprise either piezoelectric elements, or magnetodynamic or magnetostrictive transducers.

CN106324687A relates to the field of underground pipeline detection, and particularly relates to a buried iron pipeline detection and accurate positioning method and device based on magnetic anomaly vertical component analytic signal detection. The method particularly comprises the steps that multiple parallel detection paths are delimited on the ground of a detected region, magnetic anomaly analytic signal detectors are used for forming a linear array, magnetic anomaly vertical component analytic signals caused by buried iron pipelines are detected along the delimited tracks, four single-axis magnetic field sensors measure magnetic anomaly vertical components simultaneously, an analytic signal at the center of the cross is obtained through calculation and uploaded to a computer, detection surface analytic signal strength distribution is drawn on the computer, and existence and horizontal positions and orientations of the underground iron pipelines are indicated in a graph visualization mode.

There is thus a need for improved method for an AUV to track buried objects efficiently, and with a speed that surpassed today's methods.

SUMMARY

The present disclosure may mitigate, alleviate or eliminate one or more of the above-identified deficiencies and disadvantages in the prior art and solve at least the above mentioned problem. According to a first aspect there is provided a method for steering an Autonomous Underwater Vehicle along an object that is at least partly buried in seabed: the AUV being equipped with at least one acoustic transmitter for generating acoustic signal towards the buried object and the seabed; a first sensor assembly comprising one or more acoustic sensors for recording reflected acoustic signal from the buried object and the seabed, the first sensor assembly being arranged in the proximity of the starboard side of the AUV; a second sensor assembly comprising one or more acoustic sensors for recording reflected acoustic signal from the buried object and the seabed, the second sensor assembly being arranged in the proximity of the port side of the AUV; the method comprising: generating acoustic signal with the at least one acoustic transmitter; recording reflected energy from the seabed and the buried object with the first and second sensors; identifying reflected energy from the buried object in the recorded reflected energy data provided by the first and the second sensors; determining an offset of the buried object relative to the AUV from the reflected energy data; and steering the AUV along the buried object based on the offset.

According to some embodiments, the offset of the buried object relative to the AUV is determined based on a time difference between the arrival of the reflected energy from the buried object in the first sensor assembly and its arrival in the second sensor assembly.

According to some embodiments, the offset of the buried object relative to the AUV is determined based on the difference between the strength of the reflected energy signal from the buried object in the first sensor assembly and its strength in the second sensor assembly.

According to some embodiments, the offset of the buried object relative to the AUV is determined based on calculating a cross-correlation function between the first sensor assembly reflected energy signal and the second assembly reflected energy signal.

According to some embodiments, a two-way travel time of the reflected energy from the buried object at the first $t_s$ and the second $t_p$ sensor assemblies are given:

$$t_s = \frac{\sqrt{o^2 + (h+d)^2}}{v_w} + \frac{\sqrt{(o-ka)^2 + (h+d)^2}}{v_w}$$

$$t_p = \frac{\sqrt{o^2 + (h+d)^2}}{v_w} + \frac{\sqrt{(o+ka)^2 + (h+d)^2}}{v_w}$$

where
$v_w$, denotes the acousticwave velocity between the buried object and the sensor assemblies, o denotes distance between AUV and the buried object in the distance perpendicular to the direction of the elongated buried object, h is the altitude of the AUV above the seabed, and d is the burial depth of the buried object below the seabed, α angle towards the buried object, where the k is given −1 when the buried object lays towards the port side, and k=1 when the buried object lays on the starboard side.

According to some embodiments, the AUV is equipped with a processing unit for processing and analyzing the recorded reflected energy data.

According to some embodiments, the AUV 1 is equipped with additional sensor assemblies arranged at different locations on the AUV 1.

According to some embodiments, the first and the second sensor assembly have a separation in a plane perpendicular to the vertical orientation of the AUV 1.

According to some embodiments, the first and the second sensor assembly have a separation in a plane perpendicular to the horizontal direction of the AUV 1.

According to some embodiments, the AUV is equipped one or more of the following: multibeam sensors, sidescan sonar sensors, magnetometers and synthetic aperture sonar sensors.

According to some embodiments, determining the offset of the buried object relative to the AUV is determined based on data combination of reflected energy data and data from one or more of the multibeam sensors, sidescan sonar sensors, magnetometers and synthetic aperture sonar sensors.

According to a second aspect there is provided a computer program product comprising instructions adapted to carry out the method of the first aspect.

According to a third aspect there is provided a computer readable storage medium comprising a computer program product according to the second aspect.

Effects and features of the second and third aspects are to a large extent analogous to those described above in connection with the first aspect. Embodiments mentioned in relation to the first aspect are largely compatible with the second and third aspects.

The present disclosure will become apparent from the detailed description given below. The detailed description and specific examples disclose preferred embodiments of the disclosure by way of illustration only. Those skilled in the art understand from guidance in the detailed description that changes and modifications may be made within the scope of the disclosure.

Hence, it is to be understood that the herein disclosed disclosure is not limited to the particular component parts of the device described or steps of the methods described since such device and method may vary. It is also to be understood that the terminology used herein is for purpose of describing particular embodiments only, and is not intended to be limiting. It should be noted that, as used in the specification and the appended claim, the articles "a", "an", "the", and "said" are intended to mean that there are one or more of the elements unless the context explicitly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTIONS OF THE DRAWINGS

The above objects, as well as additional objects, features and advantages of the present disclosure, will be more fully appreciated by reference to the following illustrative and non-limiting detailed description of example embodiments of the present disclosure, when taken in conjunction with the accompanying drawings.

DETAILED DESCRIPTION

The present disclosure will now be described with reference to the accompanying drawings, in which preferred example embodiments of the disclosure are shown. The disclosure may, however, be embodied in other forms and should not be construed as limited to the herein disclosed embodiments. The disclosed embodiments are provided to fully convey the scope of the disclosure to the skilled person.

Figure 1:
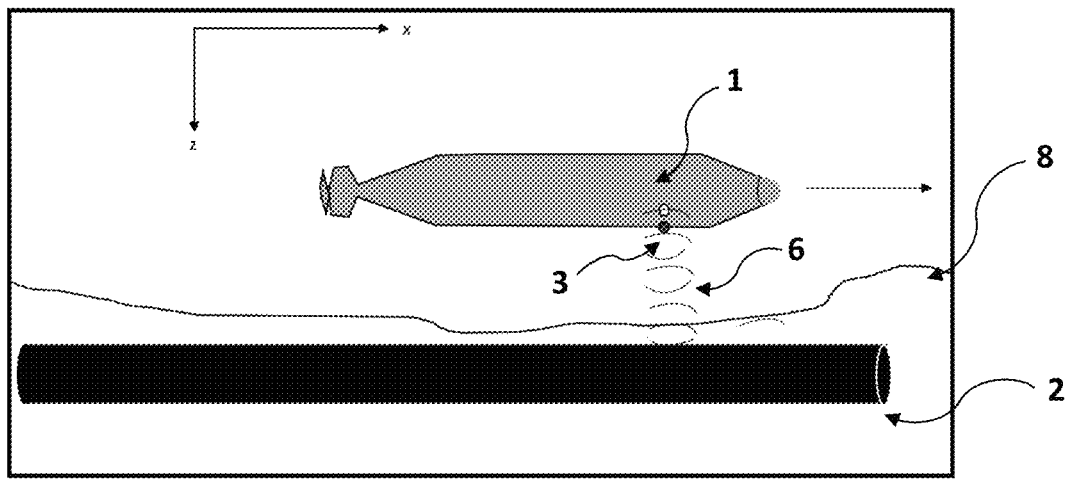
FIG. 1 shows an AUV tracking a buried object in the seabed.
Figure 2:
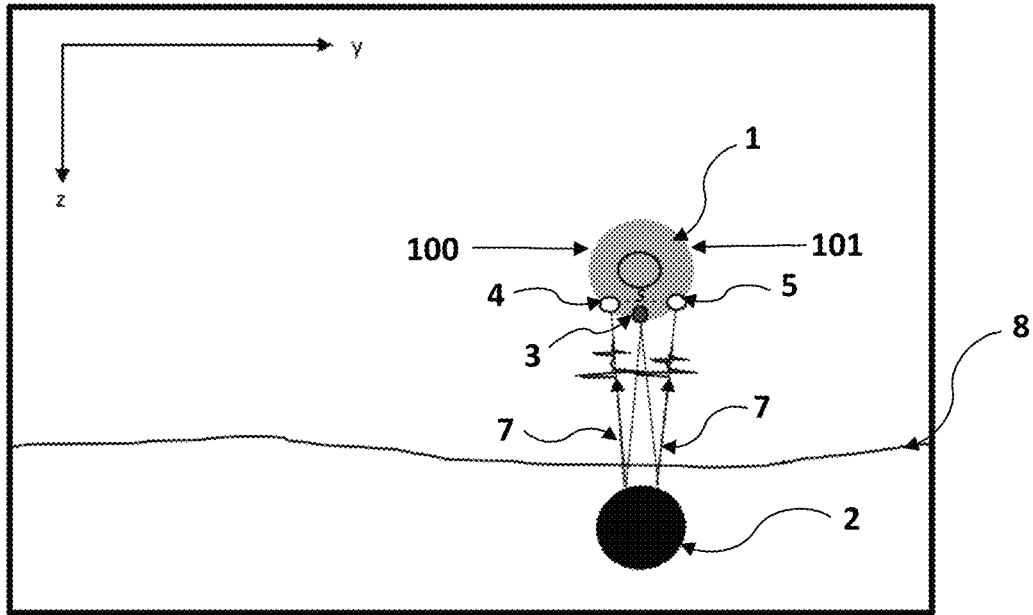
FIG. 2 shows an AUV where the buried object is direct below the AUV.

FIG. 1 and FIG. 2 show an Autonomous Underwater Vehicle 1 (AUV) tracking an object that is at least partly buried in seabed 8 seen in the plane spanned by the vertical axis and the elongated direction of the AUV 1. The AUV 1 is moving predominantly in the x-direction above the buried object 2. The AUV 1 is equipped with at least one acoustic transmitter 3 for generating acoustic signal 6 towards the buried object 2, a first sensor assembly 4 comprising one or more acoustic sensors for recording reflected energy 7 from the buried object 2 and the seabed 8, a second sensor assembly 5 comprising one or more acoustic sensors for recording reflected energy 7 from the buried object 2 and the seabed 8. The first sensor assembly 4 may be arranged in the proximity of the starboard side 100 of the AUV 1. The second sensor assembly may be arranged in the proximity of port side 101 of the AUV 1. The first sensor assembly, the second sensor assembly and the transmitter 3 may also be a separate unit that is mounted on the AUV. The buried object may be a pipeline for gas or liquid transportation, cables, installations or minerals that will reflect a seismic signal. The first and the second sensor assemblies may be separated apart a distance s in the directions perpendicular to the sail line direction, y-direction, they may also have a separation in the directions parallel to the sail line, x-direction. The first and the second sensor assemblies may have the same height above the seabed in y-direction or they may be mounted in different heights. The AUV may be equipped with additional sensor assemblies and may be arranged at different locations on the AUV.

Figure 3:
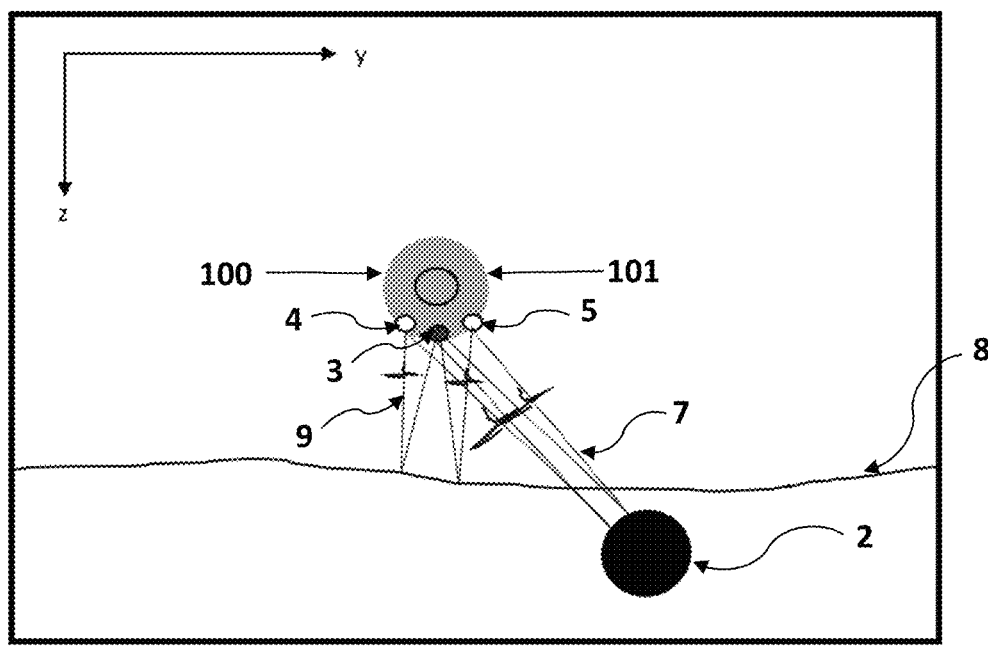
FIG. 3 shows an AUV 1 where a buried object is on the port side of the AUV.

FIG. 3 shows the AUV 1 has an offset relative to the buried object 2 on its port side 101. The first sensor assembly 4 (starboard sensor) and the second sensor assembly 5 (port side sensor) may first register the seabed reflected energy 9 approximately at the same arrival time, but the later arrival of the reflected energy 7 from the buried object 2 may arrive at the second sensor assembly 5 before it arrives at the first sensor assembly 4. The difference in the arrival time of the recorded reflected energy from the buried object 2 at the first and the second sensor assembly determines whether the buried object is on the port 101 or starboard side 100 of the AUV 1.

Figure 4:
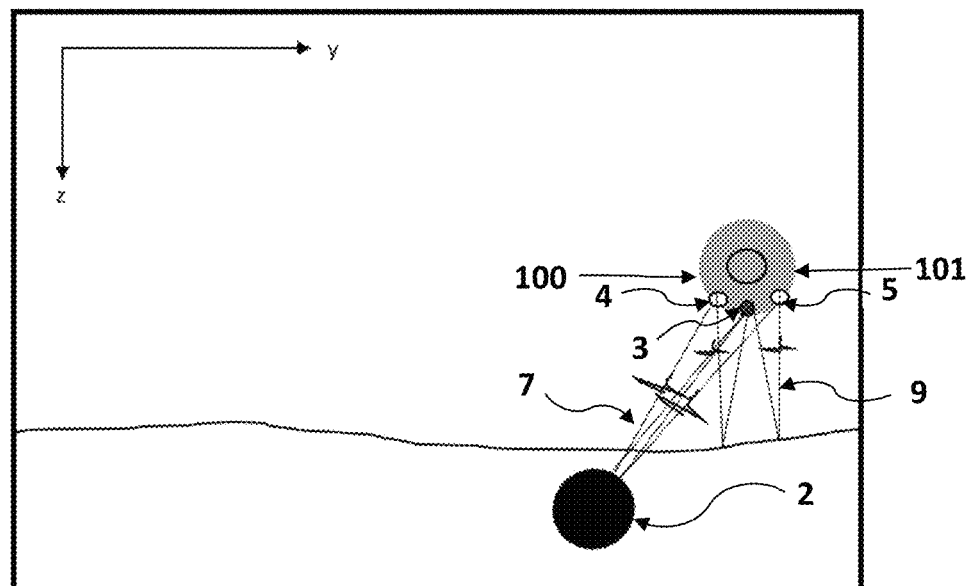
FIG. 4 shows an AUV 1 where a buried object is on the starboard side of the AUV.

FIG. 4 shows a scenario where the buried object 2 is on the starboard side 100 of the AUV 1. For this scenario, the reflected energy 7 from the buried object 2 arrives at the first sensor assembly 4 on the starboard side 100 before the second sensor assembly 5 on the port side 101 of the AUV 1.

FIG. 2 shows the scenario where the AUV 1 is approximately vertically above the buried object 2. In this scenario, the reflected energy from the buried object 2 arrives almost simultaneously.

By recording the reflected acoustic energy from the buried object and determining the arrival time difference of the reflected energy in the first and the second sensor assembly, the AUV 1 may be steered towards the direction where the reflected energy from the buried object arrives first. Several techniques may be applied to detect the arrival time difference or which of the sensors receives the reflected energy from the object first. Time difference in maximum amplitude of the reflected signals may be utilized because the buried object 2 reflects a stronger signal than the seabed due to stronger impedance contrast between the buried object and the seabed compared to the contrast between water and sandy seabed. Another method may be to calculate the cross-correlation function between the two sensor signals, and use the time (time lag) where the cross-correlation function has its maximum value as the time difference. The difference in time or time lag may be utilized to determine if the AUV 1 needs to alter the sailing direction and how much it needs to in order to move along the buried object 2.

The transmitter 3, the first sensor assembly 4 and the second sensor assembly 5 emit and record the reflected signal at a sufficiently high rate between signals to keep the AUV 1 on course. A processor inside the AUV 1 may detect the time difference or correlation lag and give the AUV 1 steering command on which direction to move, slightly more towards port side or towards starboard side, to enable the AUV to stay along (on top) the buried object while moving forward.

The AUV 1 may also record reflections from other objects and geological anomalies and changes in layers. Hence, the analysis of the signal may use various techniques to identify the time difference for the reflected energy from the buried object 2. The methods used for example be a) time difference for reflected signal strength reaching a threshold, b) cross correlation of signals, c) various filtering and automated processing techniques, d) comparison analysis using machine learning algorithms, e) seismic real-time impedance analysis.

To further enhance the probability of determining the precise offset of the buried object relative 2 to the AUV 1, it is possible to combine the data from the acoustic sensors with data from one or more multibeam sensors, side scan sonar sensors, magnetometers and synthetic aperture sonar sensors. The AUV may carry and records multiple sensor data, and multi-sensor decision approach may be to make decision on travel directions. The AUV may also be equipped with additional sensor assemblies and may be arranged in the proximity of port side 101 and starboard side 100 of the AUV 1.

In one example, the transmitter 3 emits a signal with sufficient strength and frequency range that discontinuities such as layers and buried objects 0 m-40 m below the seabed are detectable from the first and the second sensor assemblies. For the application in this example, it is reflections in the closest vicinity of the seabed that is of interest. Assuming the AUV 1 is sailing at a height of 5-30 m above the seabed, with an acoustic wave velocity velocity of 1480 m/s, the two-way travel-time for the reflected signal from the seabed is in range of 6.76 ms-40 ms. The transmitter 3 may emit signals with a center frequency range between 1 kHz and 24 kHz, which means a signal period down to 0.04 ms.

It is assumed that the signal travel-time difference can be resolved down to ¼ of the wavelength or the period. Hence, it is possible to detect changes in two-way travel-time down to at least 0.01 ms. The tracking of the buried object can be performed either within a narrow angle range from the vertical or within an angle range from one of the sides of the object.

TABLE 1

| Buried object's distance towards port (m) | Angle towards buried object (degrees) | Arrival of seabed reflected energy (ms) | Arrival of reflected energy from buried object port sensor (ms) | Arrival of reflected energy from buried object starboard sensor (ms) | Difference in buried object's arrival time between port and starboard sensor (ms) |
|---|---|---|---|---|---|
| 0.5 | 2.6 | 13.5 | 14.87 | 14.90 | 0.03 |
| 1 | 5.2 | 13.5 | 14.90 | 14.96 | 0.06 |
| 2 | 10.3 | 13.5 | 15.05 | 15.17 | 0.12 |
| 3 | 15.3 | 13.5 | 15.32 | 15.90 | 0.18 |
| 4 | 20.0 | 13.5 | 15.70 | 15.94 | 0.23 |
| 5 | 24.4 | 13.5 | 16.19 | 16.47 | 0.28 |
| 6 | 28.6 | 13.5 | 16.77 | 17.10 | 0.32 |
| 7 | 32.5 | 13.5 | 17.44 | 17.80 | 0.36 |
| 8 | 36.0 | 13.5 | 18.18 | 18.58 | 0.40 |
| 9 | 39.3 | 13.5 | 18.99 | 19.42 | 0.43 |
| 10 | 42.3 | 13.5 | 19.86 | 20.32 | 0.45 |
| 11 | 45.0 | 13.5 | 20.78 | 21.26 | 0.48 |
| 12 | 47.5 | 13.5 | 21.75 | 22.25 | 0.50 |
| 13 | 49.8 | 13.5 | 22.76 | 23.27 | 0.52 |
| 14 | 51.8 | 13.5 | 23.80 | 24.33 | 0.53 |
| 15 | 53.7 | 13.5 | 24.86 | 25.41 | 0.54 |

Table 1, above shows the difference in reflected energy travel-time recorded between the first sensor assembly 4 and the second sensor assembly 5 for the scenario where the buried object 2 is on the port side 101 of the AUV 1 as illustrated in 3. In this example, a flight height of 10m and a burial depth of 1m is used. The two sensors are here assumed to be mounted 0.5 meter apart in the direction perpendicular to the sail line direction and with the same height above the seabed. The numbers show that it is feasible to detect the rate of change in travel-time differences if the AUV 1 moves more than a 1 m further away from the buried object 2. The results are comparable for lower sailing altitudes. If the sensor separation s increases from the 0.5 m in this example, the travel-time difference will increase.

In Table 1, Angles α towards the buried object is calculated as the angle between the line from the AUV 1 and the vertical axis:

$$\alpha = \frac{180}{\pi}\arctan\left(\frac{o}{h+d}\right), \tag{1}$$

Where o denotes distance between AUV 1 and the buried object 2 in the distance perpendicular to the direction of the elongated buried object, h is the altitude of the AUV 1 above the seabed 8, and d is the burial depth of the buried object 2 below the seabed 8.

The arrival of the seabed reflection $t_b$ is the two-way traveltime of an acoustic signal 9 in the water column between the AUV 1 to the nearest seabed 8 point and is calculated as:

$$t_b = 2*\frac{h}{v_w}, \tag{2}$$

where $v_w$, denotes the acoustic wave velocity. For a flat seabed 8, the recorded two-way traveltime for the seabed 8 reflected energy 9 will arrive simultaneously at both sensors 4, 5 independent upon the distance to the buried object 2. However, for the reflected energy 7 from the buried object 2, the difference in arrival times between the two sensor assemblies 4, 5 will be dependent upon the distance between the two sensor assemblies 4, 5 measured in the horizontal direction towards the nearest point on the buried object 2. Let us define an axis perpendicular to the main AUV axis and assume that both port and starboard sensors distance from the main axis is a.

In Table 1, assuming that the acoustic wave velocity between the layers of the sensor assemblies and the buried is equal to the velocity in the water. Then the two-way traveltime $t_p$ for the reflected energy 7 recorded at second sensor assembly 5 on the port side 101 is:

$$t_p = \frac{\sqrt{o^2+(h+d)^2}}{v_w} + \frac{\sqrt{(o+ka)^2+(h+d)^2}}{v_w}, \tag{3}$$

where k is −1 when the buried object 2 lays towards the port side 101, and k=1 when the buried object 2 lays on the starboard side 100.

And for the first sensor assembly 4 on the starboard side 100, the two-way traveltime $t_s$ calculated as:

$$t_s = \frac{\sqrt{o^2+(h+d)^2}}{v_w} + \frac{\sqrt{(o-ka)^2+(h+d)^2}}{v_w}, \tag{4}$$

The AUV 1 can perform its tasks without being vertically above the buried object. A deviation of 0.5 m from the buried object 2 towards port 101 or starboard 100 in according to the calculations in Table 1, shows a time difference of 0.06 ms, and for 1m deviation 0.11 ms. The first and the second sensors assemblies is configured to have a frequency and sampling rate that can detect such a time difference.

Figure 5:
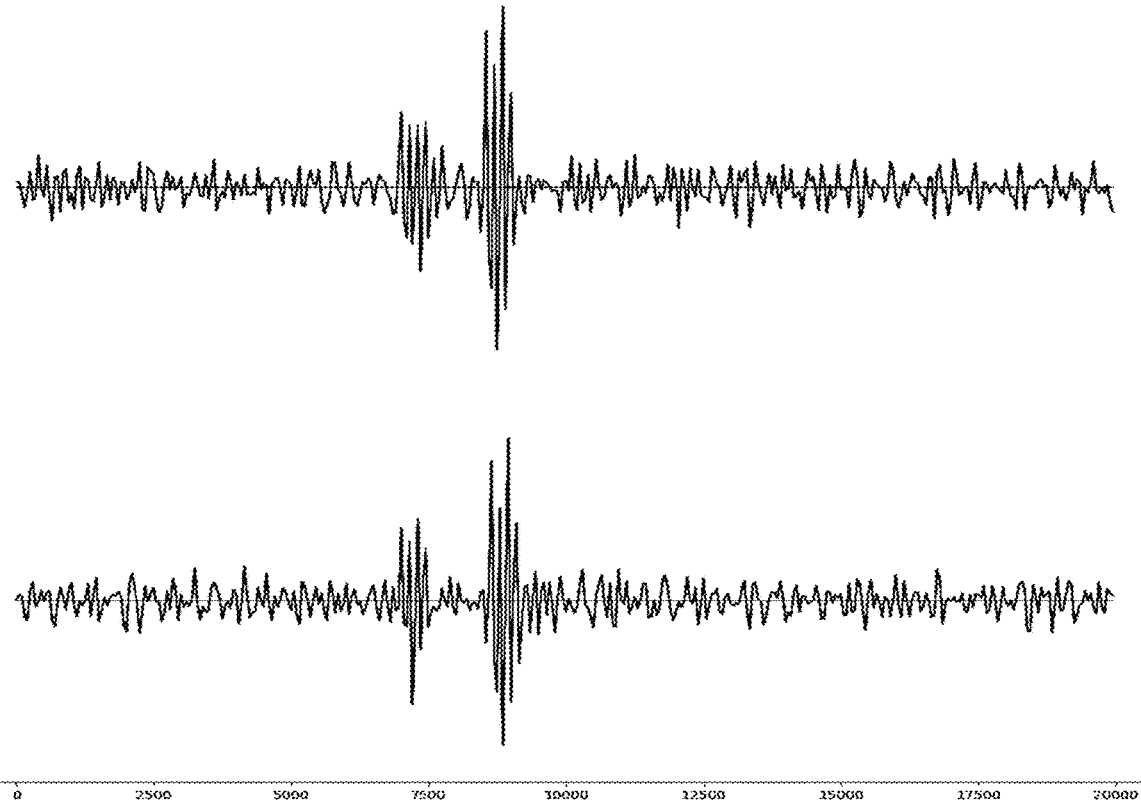
FIG. 5 shows a scenario where the buried object is positioned 0.5 m to the port side of the AUV.

In FIG. 5, the recorded data is modeled for the scenario where the buried object 2 is positioned 0.5 m to the port side 101 of the AUV 1. The theoretical time difference between the arrival time for the largest reflection which is from the buried object at the two sensor assemblies are only 0.028 ms. The recorded traces have signals with a frequency bandwidth of 5-20 kHz and the simulated sample rate is 0.05 ms. 20% bandlimited noise has been added to the traces. The noise alters the recorded data in a randomized way. However, by continuously recording and calculating the time difference several times, the average should converge towards the real difference. The AUV 1 may slowly correct its position in the crossline direction (y-direction) based on the average time difference observed in a sequence of recorded measurements for the first and the second sensor assemblies. The average time difference may be calculated by a given number of last recordings. Several methods for calculating the time difference exists and hence provide the AUV 1 with information for changing the course. In FIG. 5, one instance of recordings for the first and the second sensor assemblies is simulated. The sensors record samples of the pressure perturbations caused by the acoustic waves emitted and reflected from the seabed, from deeper reflectors, and from other objects. The time difference between the recorded times for the maximum amplitudes of the reflected energy for the two assemblies can be one method to determine if the object is to the port or to the starboard side of the AUV 1. If the port sensor assembly registers its maximum reflected amplitude earlier than the starboard assembly, it can be assumed that the object is at the port side. Similarly, if the starboard assembly reaches its maximum reflected amplitude before the port assembly, it can be assumed that the object is on the starboard side. By observing which assembly records its maximum reflected amplitude first several times in a sequence, it can be assumed that the object is on the same side as the assembly where the maximum amplitude were reached first most of the times. An alternative method would be to correlate the two traces from the two assemblies. The simulations using even the simplest method averaging over a few recordings could provide a good result. In the example in FIG. 5, the theoretical difference in time is less than one sample of the recorded signal. Still, it is possible to detect a difference in recorded time between the first sensor assembly and the second sensor assembly.

In the above equations, the acoustic wave velocity is assumed to be constant. This is an approximation of the real case where the velocity will increase below the seabed. However, this approximation is sufficient to exemplify the method, and does not impact the method itself.

The first aspect of this disclosure shows a method for steering an Autonomous Underwater Vehicle AUV 1 along an object 2 that is at least partly buried in seabed 8: the AUV 1 being equipped with at least one acoustic transmitter 3 for generating acoustic signal 6 towards the buried object 2 and the seabed 8; a first sensor assembly 4 comprising one or more acoustic sensors for recording reflected acoustic signal 7,9 from the buried object 2 and the seabed 8, the first sensor assembly 4 being arranged in the proximity of the starboard side 100 of the AUV 1; a second sensor assembly 5 comprising one or more acoustic sensors for recording reflected acoustic signal 7,9 from the buried object 2 and the seabed 8, the second sensor assembly 5 being arranged in the proximity of the port side 101 of the AUV 1; the method comprising: generating acoustic signal 6 with the at least one acoustic transmitter 3; recording reflected energy from the seabed 8 and the buried object 2 with the first and second sensors 4,5; identifying reflected energy 7 from the buried object 2 in the recorded reflected energy data provided by the first and the second sensors; determining an offset of the buried object 2 relative to the AUV 1 from the reflected energy data; and steering the AUV 1 along the buried object 2 based on the offset.

Two-way travel time of the reflected energy (7) from the buried object (2) at the first $t_s$ and the second $t_p$ sensor assemblies are given:

$$t_s = \frac{\sqrt{o^2 + (h+d)^2}}{v_w} + \frac{\sqrt{(o-ka)^2 + (h+d)^2}}{v_w}$$

$$t_p = \frac{\sqrt{o^2 + (h+d)^2}}{v_w} + \frac{\sqrt{(o+ka)^2 + (h+d)^2}}{v_w}$$

where $v_w$, denotes the acoustic wave velocity, o denotes distance between AUV 1 and the buried object 2 in the distance perpendicular to the direction of the elongated buried object, h is the altitude of the AUV 1 above the seabed 8, and d is the burial depth of the buried object 2 below the seabed 8, α angle towards the buried object (2), where the k is given −1 when the buried object 2 lays towards the port side 101, and k=1 when the buried object 2 lays on the starboard side 100.

The second aspect of this disclosure shows a computer program product comprising instructions adapted to carry out the method of the first aspect.

The third aspect of this disclosure shows a computer readable storage medium comprising a computer program product according to the second aspect.

The person skilled in the art realizes that the present disclosure is not limited to the preferred embodiments described above. The person skilled in the art further realizes that modifications and variations are possible within the scope of the appended claims. For example, variations to the disclosed embodiments can be understood and effected by the skilled person in practicing the claimed disclosure, from a study of the drawings, the disclosure, and the appended claims.

The invention claimed is:

1. A method for steering an Autonomous Underwater Vehicle (AUV) along a buried object below a seabed, the AUV being equipped with at least one acoustic transmitter for generating acoustic signal towards the buried object and the seabed;

the method comprising:

arranging a first sensor assembly flush with a starboard side of a hull of the AUV for recording reflected acoustic signals from the buried object and the seabed with the first sensor assembly comprising a first acoustic sensor;

arranging a second sensor assembly flush with a port side of the hull of the AUV for recording the reflected acoustic signals from the buried object and the seabed with the second sensor assembly comprising a second acoustic sensor;

generating an acoustic signal with a center frequency ranging between 1 kHz and 24kHz with the at least one acoustic transmitter;

recording a reflected energy from the seabed and a reflected energy from the buried object with the first acoustic sensor and the second acoustic sensor;

registering the reflected energy from the buried object in recorded reflected energy data provided by the first acoustic sensor and the second acoustic sensor, distinguishing the buried object from the seabed by a later arrival of the reflected energy from the seabed and the reflected energy from the buried object;

determining which of the starboard side or the port side the buried object lies relative to the AUV by determining which of the first acoustic sensor or the second acoustic sensor recorded the reflected energy from the buried object first; and navigating the AUV towards the buried object based on which of the starboard side or the port side the buried object lies relative the AUV.

2. The method according to claim 1, wherein determining which of the starboard side or the port side the buried object lies relative to the AUV is based on a time difference between an arrival of the reflected energy from the buried object to the first sensor assembly and an arrival of the reflected energy from the buried object to the second sensor assembly.

3. The method according to claim 1, wherein determining which of the starboard side or the port side the buried object lies relative to the AUV is based on calculating a cross-correlation function between a first sensor assembly reflected energy signal and a second sensor assembly reflected energy signal.

4. The method according to claim 3, wherein determining which of the starboard side or the port side the buried object lies relative to the AUV is calculated using a two-way travel time of the reflected energy from the buried object at the first sensor assembly ($t_s$) and the second sensor assembly ($t_p$), given by:

$$t_s = \frac{\sqrt{o^2 + (h+d)^2}}{v_w} + \frac{\sqrt{(o-ka)^2 + (h+d)^2}}{v_w}$$

$$t_p = \frac{\sqrt{o^2 + (h+d)^2}}{v_w} + \frac{\sqrt{(o+ka)^2 + (h+d)^2}}{v_w}$$

where $v_w$ denotes the an acoustic wave velocity, o denotes a distance between the AUV and the buried object measured perpendicular to a direction of the buried object, h is an altitude of the AUV above the seabed, and d is a burial depth of the buried object below the seabed, a is a distance of both the first acoustic sensor and the second acoustic sensor from a main axis of the AUV, and where k=−1 when the buried object lies on the port side, and k=1 when the buried object lies on the starboard side.

5. The method according to claim 1, wherein the AUV is equipped with a processing unit for processing and analyzing the recorded reflected energy data.

6. The method according to claim 1, wherein the AUV is equipped with additional sensor assemblies arranged at locations different from those of the first sensor assembly and the second sensor assembly on the AUV.

7. The method according to claim 1, wherein the first sensor assembly and the second sensor assembly have a separation in a plane perpendicular to a vertical orientation of the AUV.

8. The method according to claim 1, wherein the first sensor assembly and the second sensor assembly have a separation in a plane perpendicular to a horizontal direction of the AUV.

9. The method according to claim 1, wherein the AUV is equipped one or more of the following: multibeam sensors, sidescan sonar sensors, magnetometers, and synthetic aperture sonar sensors.

10. The method according to claim 9, wherein determining which of the starboard side or the port side the buried object lies relative to the AUV is based on data combination of reflected energy data and data from one or more of the multibeam sensors, sidescan sonar sensors, magnetometers and synthetic aperture sonar sensors.

11. A computer program product comprising instructions to carry out processing and analysis of the recorded reflected energy data according to the method of claim 3.

12. A non-transitory computer readable storage medium comprising a computer program product according to claim 11.

13. The method according to claim 1, further comprising distinguishing the buried object from the seabed based on an amplitude difference between the reflected energy from the seabed and the reflected energy from the buried object.

\* \* \* \* \*